United States Patent [19]

Segalla

[11] Patent Number: 4,552,095
[45] Date of Patent: Nov. 12, 1985

[54] FEEDING TROUGH FOR FLYING ANIMALS, PARTICULARLY TURKEYS, CAPABLE OF REGULATING THE LEVEL OF THE FEED

[75] Inventor: Ruggero Segalla, Vicenza, Italy

[73] Assignee: Sky S.p.A., Sandrigo, Italy

[21] Appl. No.: 625,030

[22] Filed: Jun. 27, 1984

[30] Foreign Application Priority Data

Jul. 13, 1983 [IT] Italy ............................ 84950 A/83

[51] Int. Cl.$^4$ .................................................. A01K 5/00
[52] U.S. Cl. .................................. 119/53; 119/52 AF
[58] Field of Search ............... 119/52 AF, 53, 53.5, 119/56

[56] References Cited
U.S. PATENT DOCUMENTS 3,388,690  6/1968  Hostetler .......................... 119/53
3,971,340  7/1976  Allen .............................. 119/52 AF

FOREIGN PATENT DOCUMENTS 1181482  11/1964  Fed. Rep. of Germany ........ 119/52 AF

*Primary Examiner*—Hugh R. Chamblee
*Attorney, Agent, or Firm*—Bucknam and Archer

[57] ABSTRACT

A feeding trough for flying animals, particularly turkeys, capable of adjusting the level of the feed, of the type in which the feeding troughs are arranged in series along distribution lines of the feed in sheds, is described. The feeding trough is of high stability and at the same time permits to adjust the level of the feed with a simple and rapid maneuver which may be carried out in a centralized position of the shed. The feeding trough comprises a suspended plate (2), supported by arms (3) which are connected directly to the horizontal tubular conduit (5) used for the transportation of the feed. The feeding trough also comprises an element for the distribution of the feed in the plate which comprises an element (11) for the regulation of the level of the feed. The latter is actuated by means of cables from a centralized position of the shed.

9 Claims, 3 Drawing Figures

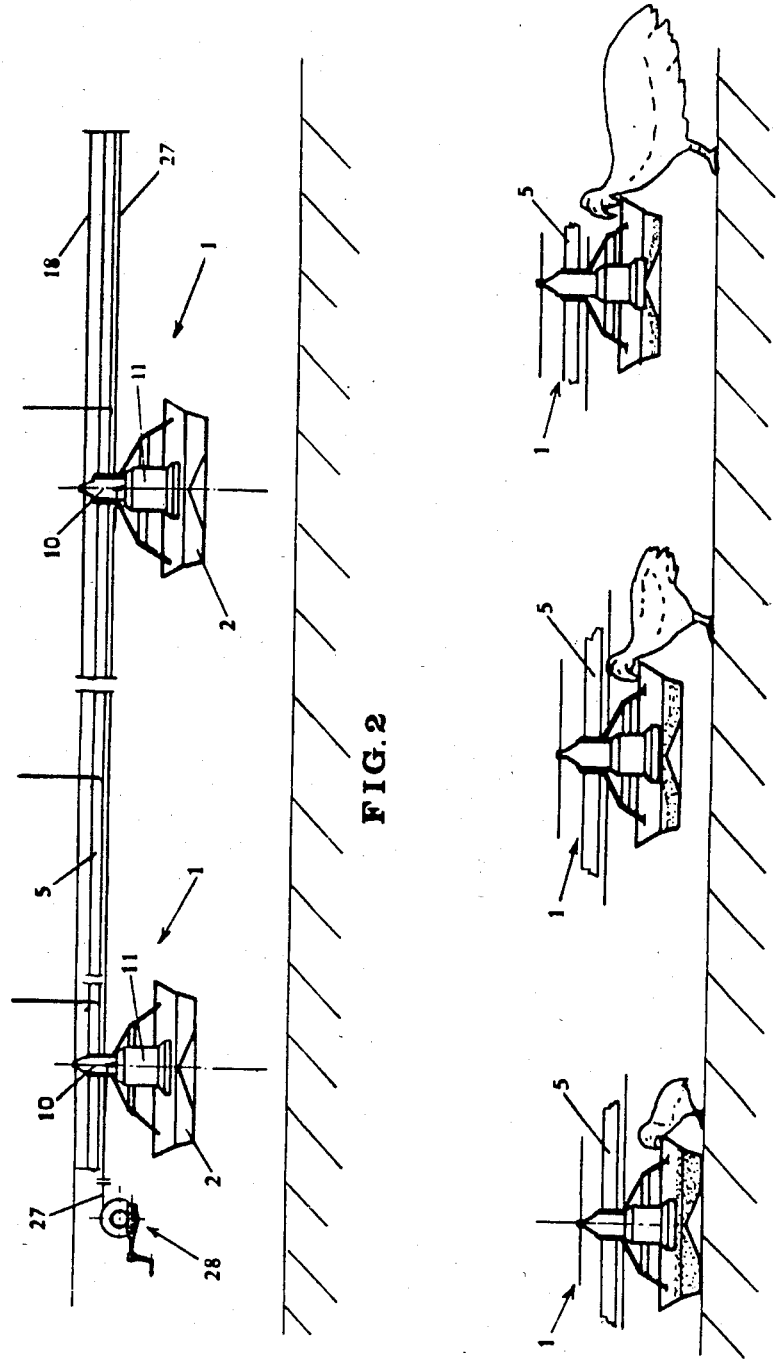

FEEDING TROUGH FOR FLYING ANIMALS, PARTICULARLY TURKEYS, CAPABLE OF REGULATING THE LEVEL OF THE FEED The present invention relates to feeding troughs for flying animals and more specifically, turkeys. More particularly, the present invention relates to the type of feeding troughs which comprise a circular plate in which the level of the feed may be adjusted and the troughs are arranged in series along distribution lines of the feed in separate sheds. It is will known that these distribution lines are constituted by a horizontal tubular conduit suspended from the ground within which the feed is inserted by means of suitable devices, for instance, a screw feeder, the feed being transported from a silo to the troughs which are arranged in series under it. The plate of the troughs is fed by means of a distribution element for the feed, which element is connected to the tubular conduit, the latter being constituted essentially of a hollow cylindrical element, the relative position of which is adjustable with respect to the plate itself and this position determines the level of the feed in the interior of the trough as a function of the size and, therefore, the age of the animal being fed. Actually, the adjustment of the level of the feed in the plate is carried out by the farmer placing the feed in each distributing element of each feeding trough with substantial expenditure of time and obviously, a substantial disadvantage economically. In addition, the plates of the feeding troughs used up to the present time, are usually fixed by means of suitable radially arranged supporting arms to the distribution elements which are connected to the horizontal tubular conduit used to transport the feed. This fact obviously causes a substantial disadvantage with respect to the stability of the feed itself, particularly when the latter is intended for the feeding of animals of substantial size such as turkeys and also because the distribution element of the feed is usually made of plastic material.

An object of the present invention, thereofre, is to overcome the drawbacks mentioned hereinabove with respect to the conventional devices and to provide a feeding trough particularly suitable for the feeding of flying animals of substantial size.

Another object of the present invention is to provide a feeding trough which has a superior stability and which is suitable for adjusting the level of the feed with a simple and quick maneuvering operation which may be carried out from a centralized position of the shed.

The crux of the present invention resides in providing a feeding trough particularly suitable for turkeys of the type which utilize a series of sheds along distribution lines of the feed and which comprise a plate suspended from the ground and supported by a plurality of radially arranged supporting arms. Above the plate, a distribution element of the feed is placed, which distribution element is hollow internally and which is connected and communicates with an horizontal tubular conduit for the transportation of the feed, being introduced from the silo. This distribution element comprises a fixed distributing element and an element for the regulation of the level of the feed made in the shape of a sleeve, the latter being essentially cylindrical and being external with respect to the fixed distributing element. An essential feature of the feeding trough according to the present invention is that the supporting arms are directly connected to the tubular conduit and that the element being used to adjust the level of the feed, for the purpose of moving vertically from a lower position in the proximity of the bottom of the plate and an upper position, is supported and actuated by means of maneuvering cables which are connected by means of transmission elements to a main cable disposed parallelly to this tubular conduit and having a length corresponding to the same and connected to a centralized actuating device.

Other characteristics and advantages of the present invention will appear more clearly from the following detailed description which represents a preferred form of the invention and which is shown by way of illustration and the drawings in which:

FIG. 2 is a schematic side view of one distribution line of the feed in accordance with the feeding trough of the present invention.

FIGS. 3a, 3b and 3c represent schematically three positions of the feeding trough with respect to the ground and with respect to the element which regulates the level of the feed with respect to the plate as a function of the size of the animal.

Figure 1:
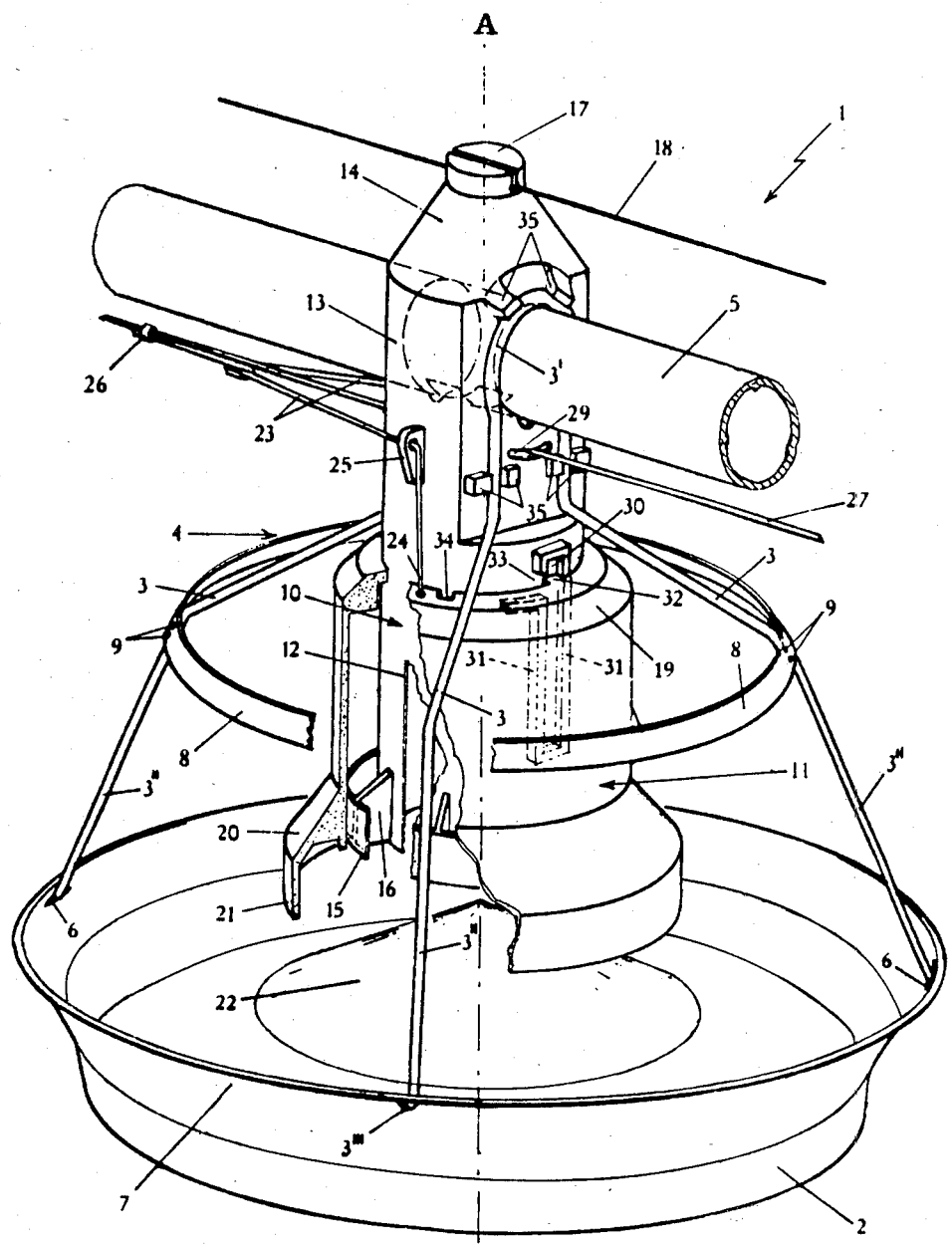
FIG. 1 is an overall vertical view of the feeding trough with certain parts removed in order to represent more clearly other parts.

By reference to the attached drawings numeral 1 designates the feeding trough according to the present invention. The feeding trough consists of a plate 2 of known type which is suspended and which is provided with supporting arms 3 and a distribution element 4 for the feed which is connected with the horizontal tubular conduit 5 suitable for the transportation of the feed which is introduced from a silo, the latter not being shown. More particularly, as shown in FIG. 1, the supporting arm 3 consists of a pair of shaped metallic rods, each one of them being folded in a U-shape and inverted along the central zone 3' so as to provide a bracket resting on the tubular conduit 5 and provided with ends 3" which diverge radially with respect to the vertical axis (A) of the distribution element 4 with respect to which they are adjacent in the U-portion designated by the symbol 3'. The extremities 3'" of the arms 3 are partially folded and inserted within corresponding slots 6 which are formed along the raised border 7 of the plate 2. It should be noted that, in view of the fact that the arms 3 consists of metallic rods, they are flexible and, therefore, they may be removed from the slots 6 simply by applying a small pressure along the extremity 3" in a direction essentially centripetal with respect to the axis A. Numeral 8 designates a reinforcing element of annular shape capable of imparting rigidity to the upper part of the arms 3 to which it is fixed by means of rivets 9. This structure results therefore totally independent from the distribution element 4. The latter as shown in FIG. 1 consists of a fixed distributing element 10 which is connected in known manner to the tubuluar conduit 5 and of an element 11 for the regulation of the level of the feed disposed externally with respect to the element 10 with respect to which it is essentially coaxial and moveable. More specifically, the distributing element 10 is formed of a hollow cylindrical body 12 provided in the upper part with head 13 which has a quadrangular cross-section and upper dome 14 which is convex and in the lower part with a ring portion 15. The latter has a diameter greater than the body 12 and is connected to the body 12 by means of spokes 16. The upper part 14 is provided with a support 17 within which is inserted the conventional electric conductor 18 capable of preventing the animal to roost on the conduit 15.

The regulating element 11 is shaped substantially in the shape of a cylindrical sleeve with upper portion 19 which is truncoconical and which is provided with bottom 20, the latter also being a truncoconical shape. The bottom 20 is provided with a cylindrical lower portion 21 capable of preventing the insertion of the beak of the animal in the zone between the internal wall of the bottom 20 and the conical surface 22 which is provided in the center of the plate 2.

In this manner, the element 11 which acts as a regulator of the level of the feed may slide along element 10 and is supported and actuated in its motion by means of a maneuvering cable consisting of a folded tie 23 having its ends 24 fixed to the upper part of element 11 and slidably inserted within a pair of perforated tabs 25 which serve as transmission elements and which are disposed on the head 13 is position diametrically opposite with respect to the axis (A). The tie 23 is fixed by means of clamps 26 to a main cable 27 which is disposed parallel to the conduit 5 and below it. The cable 27 is actuated by means of suitable centralized device 28. In this manner, it is possible to carry out the adjustment of the level of the feed simultaneously in all the feeding troughs 1 as shown in FIG. 2. It should be noted that the main cable 27 is slidably inserted within the head 13 in an opening 29 perpendicular to the axis (A) and having a crescent shape so as to permit oscillations of one feeding trough 1 around the axis of the conduit 5 without applying tension to the cable 27, a fact which would cause undesirable displacement of the elements which serve to regulate the level in the adjacent feeding troughs 1.

As shown in FIG. 1, the external surface of the cylindrical body 12 is provided with a pair of vertical guides 30 which are disposed in a position diametrically opposite with respect to the axis (A) each of which is defined by a shaped rib 31. The raised portions 32 which are formed on the internal cylindrical surface of the regulating element 11 are slidably housed within the guides. In the proximity of the upper part of each guide 30, the corresponding rib 31 presents a lower portion 33 suitable for the removal of the raised portion 32. This removal as well as the insertion is carried out by rotating the regulatory element 11 around the axis (A). In this connection, one should note that in the upper part of the element 11, there is provided a pair of cavities 32 suitably positioned with respect to the raised portions 32 to permit the passage of the tabs 25 during the insertion and the removal of the elements 10 and 11.

The connection between the supporting arms 3 and the distribution element 4 is achieved by means of a plurality of shaped projections 35 which are located on the head 33 in proximity of the inlet and exit ports respectively of the tubular conduit 5, which ports define the location of the housing of the upper part 3' of the arms which is formed in U-shape.

Obviously, several embodiments of the invention are possible different from the illustrated embodiment and several modifications are possible, which modifications will be obvious to one skilled in the art without departing from the scope of the present invention which is to be defined only by the appended claims.

What is claimed is:

1. A feeding trough for the adjustment of the level of the feed for flying animals and particularly turkeys wherein each trough comprises a suspended plate (2), a plurality of arms (3) radially arranged for supporting the plate, a distributing element for the feed (4) located above the plate, which distributing element (4) is internally hollow, an horizontal tubular conduit (5) communicating with said distribution element (4), said conduit (5) transporting the feed from a silo, said distributing element (4) comprising a fixed distributing element (10) and an element for the regulation of the level of the feed (11) in the shape of a sleeve, said regulating element (11) being essentially cylindrical and moveable and being located externally to said fixed distributing element (10), said arms (3) being directly connected with said tubular conduit (5), means for moving vertically said regulating element (11) from a lower position in the proximity of the bottom of said plate to an upper position consisting of ties (2) connected through transmission elements to a main cable (27), said cable (27) being located parallel to and underneath said tubular conduit (5) and having a length corresponding thereto and a centralized actuating device (28) being connected to said tie (23).

2. The feeding trough according to claim 1 wherein said ties (23) have the extremities fixed to the upper portion of said regulating element (11) in a position diametrically opposite with respect to the vertical axis thereof.

3. The feeding trough according to claim 2 wherein said arms (3) consist of a pair of shaped metallic rods, each one of said rods being folded to a U-shape in the center portion which rests on said tubular conduit (5), each of said rods having diverging extremities, and said plate along its peripheral border is provided with slots (6) for the insertion of said extremities of said arms.

4. The trough according to claim 2 which is provided with a reinforcing element (8), said element (8) being substantially annular and connecting said arms (3).

5. The feeding trough according to claim 2 wherein said main cable (27) is slidably inserted within an opening (29), said opening being transversely formed in said distributing element (10) at a level lower than said tubular conduit (5).

6. The feeding trough according to claim 5 wherein said opening (29) has a crescent shape.

7. A feeding trough for the adjustment of the level of the feed for flying animals and particularly turkeys wherein each trough comprises a suspended plate (2), a plurality of arms (3) radially arranged for supporting the plate, a distributing elment for the feed (4) located above the plate, which distributing element (4) is internally hollow, an horizontal tubular conduit (5) communicating with said distribution element (4), said conduit (5) transporting the feed from a silo, said distributing element (4) comprising a fixed distributing element (10) and an element for the regulation of the level of the feed (11) in the shape of a sleeve, said regulating element (11) being essentially cylindrical and moveable and being located externally to said fixed distributing element (10), said arms (3) being directly connected with said tubular conduit (5), means for moving vertically said regulating element (11) from a lower position in the proximity of the bottom of said plate to an upper position consisting of ties (23) connected through transmission elements to a main cable (27), said cable (27) being located parallel to said tubular conduit (5) and having a length corresponding thereto and a centralized actuating device (28) being connected to said tie (23), wherein the upper external portion of said distributing element (10) is provided with projections (35) arranged diametrically opposite with respect to the vertical axis of said distributing element (10) and said tubular conduit (5) has inlet and exit ports and said projections (35) are located in the proximity of said ports, said projections providing the location of housing of said upper portion of said U-shaped arms, said location of housing permitting the reciprocal fixation between said arms and said distributing element (10).

8. A feeding trough for the adjustment of the level of the feed for flying animals and particularly turkeys wherein each trough comprises a suspended plate (2), a plurality of arms (3) radially arranged for supporting the plate, a distributing element for the feed (4) located above the plate, which distributing element (4) is internally hollow, an horizontal tubular conduit (5) communicating with said distribution element (4), said conduit (5) transporting the feed from a silo, said distributing element (4) comprising a fixed distributing element (10) and an element for the regulation of the level of the feed (11) in the shape of a sleeve, said regulating element (11) being essentially cylindrical and moveable and being located externally to said fixed distributing element (10), said arms (3) being directly connected with said tubular conduit (5), means for moving vertically said regulating element (11) from a lower position in the proximity of the bottom of said plate to an upper position consisting of ties (23) connected through transmission elements to a main cable (27), said cable (27) being located parallel to said tubular conduit (5), and having a length corresponding thereto and a centralized actuating device (28) being connected to said tie (23), wherein the external surface of said distributing element (10) is provided with at least one rib (31), said rib defining a vertical guide (30) and said regulating element (11) has an internal cylindrical surface, said cylindrical surface being provided with projections (32), said projection (32) being slidably inserted within said vertical guide and said rib (31) being capable of disengaging said projection (32) by rotation of said regulating element (11) with respect to said fixed distributing element (10).

9. A feeding trough for the adjustment of the level of the feed for flying animals and particularly turkeys wherein each trough comprises a suspended plate (2), a plurality of arms (3) radially arranged for supporting the plate, a distributing element for the feed (4) located above the plate, which distributing element (4) is internally hollow, an horizontal tubular conduit (5) communicating with said distribution element (4), said conduit (5) transporting the feed from a silo, said distributing element (4) comprising a fixed distributing element (10) and an element for the regulation of the level of the feed (11) in the shape of a sleeve, said regulating element (11) being essentially cylindrical and moveable and being located externally to said fixed distributing element (10), said arms (3) being directly connected with said tubular conduit (5), means for moving vertically said regulating element (11) from a lower position in the proximity of the bottom of said plate to an upper position consisting of ties (23) connected through transmission elements to a main cable (27), said cable (27) being located parallel to said tubular conduit (5) and having a length corresponding thereto and a centralized actuating device (28) being connected to said tie (23), wherein said transmission elements consist of a pair of perforated tabs (25) disposed above said regulating element (11) and said distributing element (10) has an external surface and said tabs (25) are located on said external surface in position diametrically opposite with respect to the vertical axis of said regulating element, said ties being inserted slidably within said perforated tabs (25).

* * * * *

UNITED STATES PATENT AND TRADEMARK OFFICE
CERTIFICATE OF CORRECTION

PATENT NO. : 4,552,095

DATED : November 12, 1985

INVENTOR(S) : Ruggero Segalla et al

It is certified that error appears in the above-identified patent and that said Letters Patent is hereby corrected as shown below:

On the title page assignee should read
--(73) Assignee: SKA S.p.A., Sandrigo, Italy --.

Signed and Sealed this

Twenty-ninth Day of April 1986

[SEAL]

Attest:

DONALD J. QUIGG

Attesting Officer

Commissioner of Patents and Trademarks